United States Patent
Barborak et al.

(10) Patent No.: US 9,946,764 B2
(45) Date of Patent: *Apr. 17, 2018

(54) EVALUATING PASSAGES IN A QUESTION ANSWERING COMPUTER SYSTEM

(71) Applicant: International Business Machines Corporation, Armonk, NY (US)

(72) Inventors: Michael A. Barborak, Mount Kisco, NY (US); James J. Fan, Mountain Lake, NJ (US); Michael R. Glass, Ossining, NY (US); Aditya A. Kalyanpur, Fort Lee, NJ (US); Adam P. Lally, Cold Spring, NY (US); James W. Murdock, IV, Millwood, NY (US); Benjamin P. Segal, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/640,063

(22) Filed: Mar. 6, 2015

(65) Prior Publication Data

US 2016/0125013 A1   May 5, 2016

Related U.S. Application Data

(63) Continuation of application No. 14/533,301, filed on Nov. 5, 2014.

(51) Int. Cl.
*G06F 17/30* (2006.01)
*G06F 17/27* (2006.01)

(52) U.S. Cl.
CPC .... *G06F 17/3053* (2013.01); *G06F 17/30345* (2013.01); *G06F 17/30654* (2013.01); *G06F 17/30731* (2013.01); *G06F 17/2785* (2013.01)

(58) Field of Classification Search
CPC .................. G06F 17/2785; G06F 17/30663
See application file for complete search history.

(56) References Cited

U.S. PATENT DOCUMENTS

2010/0063797 A1* 3/2010 Cong ................ G06F 17/30734
704/9
2012/0078636 A1* 3/2012 Ferrucci ........... G06F 17/30654
704/270.1

(Continued)

OTHER PUBLICATIONS

List of IBM Patents or Patent Applications Treated as Related; Mar. 6, 2015, 2 pages.

(Continued)

*Primary Examiner* — Apu Mofiz
*Assistant Examiner* — Sheryl Holland
(74) *Attorney, Agent, or Firm* — Cantor Colburn LLP

(57) ABSTRACT

According to an aspect, a processing system of a question answering computer system determines a first set of relations between one or more pairs of terms in a question. The processing system also determines a second set of relations between one or more pairs of terms in a candidate passage including a candidate answer to the question. The processing system matches the first set of relations to the second set of relations. A plurality of scores is determined by the processing system based on the matching. The processing system aggregates the scores to produce an answer score indicative of a level of support that the candidate answer correctly answers the question.

7 Claims, 6 Drawing Sheets

(56) References Cited

U.S. PATENT DOCUMENTS

| | | | |
|---|---|---|---|
| 2012/0078888 A1* | 3/2012 | Brown .............. | G06F 17/30654 707/723 |
| 2012/0131016 A1* | 5/2012 | Brown .............. | G06F 17/30696 707/748 |
| 2013/0007033 A1* | 1/2013 | Brown .............. | G06F 17/30654 707/764 |
| 2013/0007055 A1* | 1/2013 | Brown .............. | G06F 17/30654 707/769 |
| 2013/0246046 A1* | 9/2013 | Fan ..................... | G06F 17/2785 704/9 |
| 2015/0026106 A1* | 1/2015 | Oh ...................... | G06F 17/3069 706/12 |
| 2015/0293917 A1* | 10/2015 | Bufe, III ........... | G06F 17/30867 706/12 |
| 2016/0125751 A1* | 5/2016 | Barker ................ | G06F 17/3053 434/322 |

OTHER PUBLICATIONS

U.S. Appl. No. 14/533,301, filed Nov. 5, 2014, Entitled: Evaluating Passages in a Question Answering Computer System, First Named Inventor: Michael A. Barborak.

* cited by examiner

EVALUATING PASSAGES IN A QUESTION ANSWERING COMPUTER SYSTEM

DOMESTIC PRIORITY

This application is a continuation of U.S. application Ser. No. 14/533,301 filed Nov. 5, 2014, the disclosure of which is incorporated by reference herein in its entirety.

BACKGROUND

The present disclosure relates generally to a question answering computer system, and more specifically, to evaluating passages by aggregation of relation matches in a question answering computer system.

An information retrieval computer system typically receives a query, identifies keywords in the query, searches documents for the keywords, and ranks results of the searching to identify best matches. Some information retrieval computer systems output a list of best matching results to a user, such that the user can then attempt to determine if desired information can be found in the results. Keyword searching often uses frequency-based scoring for words or synonyms, but such searches typically fail to consider the context of particular words. More advanced question answering computer systems typically employ natural-language processing (NLP) that returns a highest scoring answer to a question in a natural language format. NLP techniques, which are also referred to as text analytics, infer the meaning of terms and phrases by analyzing their syntax, context, and usage patterns.

Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task. These techniques include, for example, shallow parsing, deep parsing, information extraction, word-sense disambiguation, latent semantic analysis, textual entailment, and co-reference resolution. None of these techniques is perfect or complete in their ability to decipher the intended meaning. Unlike programming languages, human languages are not formal mathematical constructs. Given the highly contextual and implicit nature of language, humans themselves often disagree about the intended meaning of any given expression.

Detecting semantic relations in text is very useful in both information retrieval and question answering because it enables knowledge bases (KBs) to be leveraged to score passages and retrieve candidate answers. Approaches for extracting semantic relations from text include exploitation of statistics about co-occurrences of terms, usage of patterns and rules, usage of different features (such as lexical, syntactic, semantic and contextual) to train machine learning (ML) classifiers, various kernel based ML approaches and hybrid approaches that combine multiple ML based approaches.

A question answering computer system can use a primary search to retrieve documents, passages and other types of information (from both structured, e.g., a knowledgebase, and unstructured sources), with respect to a query formulated from a given question, which are later used for candidate answer generation. Candidate answers can then be evaluated with respect to candidate passage evidence that supports or refutes the candidate answer. The objective of supporting evidence retrieval is to retrieve candidate passages with respect to a query formulated from the question plus the candidate answer. Just a minor fraction of the collected passages exhibit evidence that is actually useful to justify the answer, therefore a critical capability of a question answering computer system is to decide whether it is worthwhile to consider a passage for generating evidence. The task of identifying which of the retrieved passages are actually providing useful information to answer the question is also known as passage justification. Passage scorers use various techniques to judge a candidate passage, including methods based on surface similarity (i.e. textual alignment) with the question, logical form alignment, structural similarity based on syntactic-semantic graphs, various linguistic features, etc.

SUMMARY

Embodiments include a method for evaluating passages by aggregation of relation matches in a question answering computer system. In one aspect, a processing system of a question answering computer system determines a first set of relations between one or more pairs of terms in a question. The processing system also determines a second set of relations between one or more pairs of terms in a candidate passage including a candidate answer to the question. The processing system matches the first set of relations to the second set of relations. A plurality of scores is determined by the processing system based on the matching. The processing system aggregates the scores to produce an answer score indicative of a level of support that the candidate answer correctly answers the question.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
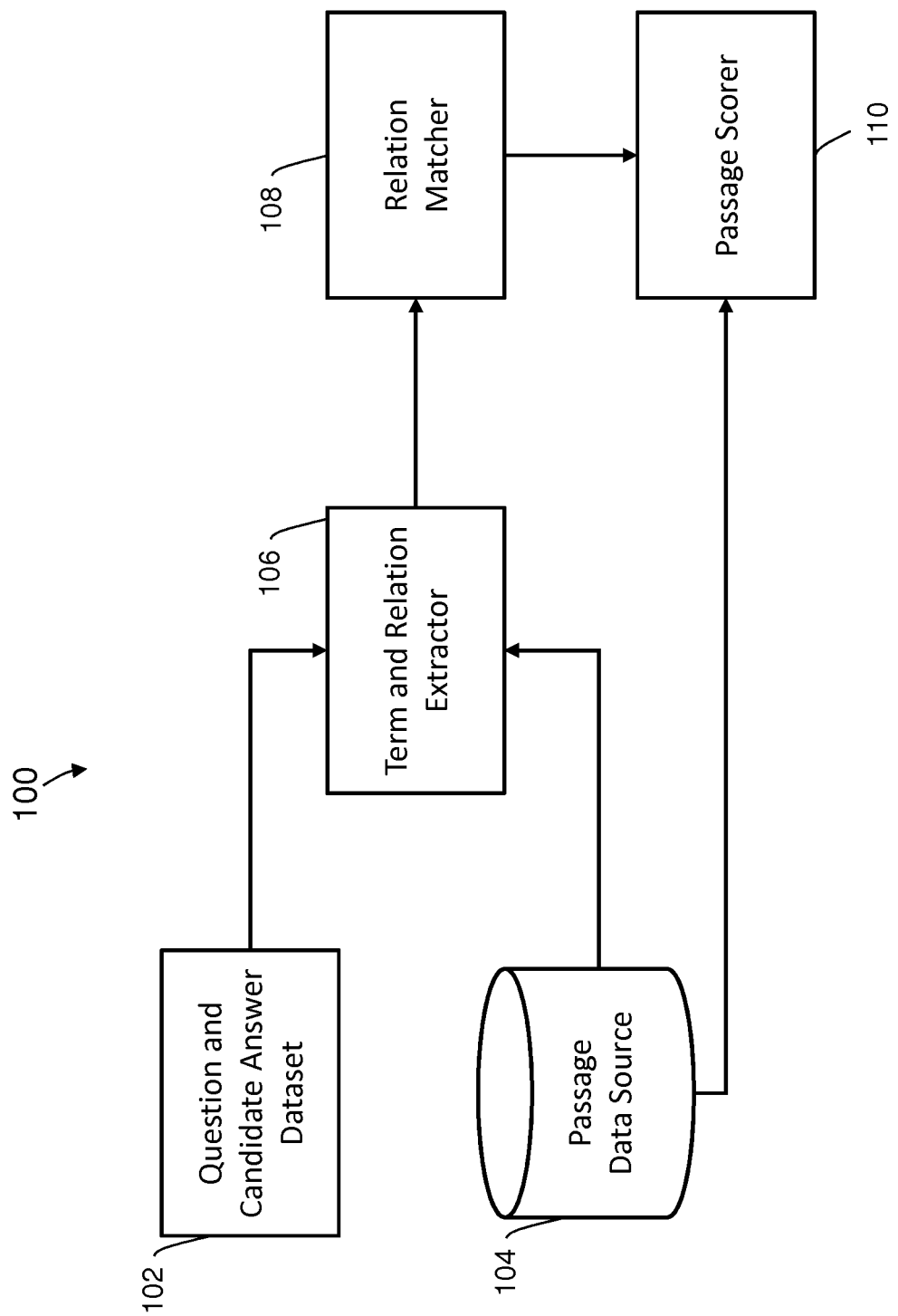
FIG. 1 depicts a block diagram of a dataflow for evaluating passages by aggregation of relation matches in accordance with an embodiment.

Embodiments disclosed herein relate to evaluating passages by aggregation of relation matches in a question answering computer system. A question answering computer system can decompose textual entailment of relationships between terms into multiple relation matching problems. Textual entailment can be used in conjunction with a passage scoring process based on relation matching. Relation matching may be defined as: given a pair of terms in H (an entailed hypothesis) and a pair of terms in T (an entailing text), determine if a relationship between the terms in T entails a relationship between the terms expressed in H. Exemplary embodiments evaluate relation matches and produce a vector of relation match features for pairs of relations in H and T. The relation match features can be aggregated to determine the overall degree of textual entailment between H and T, and, in a question answering setting, the likelihood of a candidate answer being correct.

As used herein, a "term" is a structure that contains text and analysis for a single primitive syntactic unit, such as "frog", "three hundred and twenty", "quickly", "about", etc. A term can include more than one word, such as a title, a first and last name, a place, and the like. A "focus term" refers to a term in a question corresponding to whatever is being asked for. For instance, in the question "who invented the electric light?" the focus term would have the text "who". A "candidate answer occurrence term" is a term in a passage corresponding to some answer that the system is intended to evaluate. In the passage "Humphry Davy invented the first electric lamp", the term "Humphry Davy" would be a good candidate answer term. Assuming that the focus term and candidate term match transforms the passage scoring problem to a textual entailment problem.

A "relation" is a pair of terms in a subject of analysis (question or passage). For any two terms in a subject of analysis there exists some relation expressed in that subject of analysis. In the passage "Parkinson's Disease causes tremor", there is a relation (Parkinson's Disease, tremor) that can be named as "subject of"; a relation (tremor, causes) that can be named as "object of"; and a relation (Parkinson's Disease, tremor) that can be named as "disease has symptom". The relations need not all be given a name.

A "relation of interest" is a relation from the question, identified by the application that is using passage scoring, where the application desires to know if the passage provides evidence for that relation being true. In a straightforward question answering application, this could be any relation involving the focus term. This can be generalized to handle cases where there is no focus, such as in traditional textual entailment.

A "relation weight" is a nonnegative number assigned to a relation indicating its importance relative to the other relations. The relation weight can be assigned by an application that is using passage scoring. A relation weight may be a generalization of a relation of interest, where a relation of interest is any relation having a weight greater than 0.

A "relation match feature" is a (label, value) pair associated with a pair of relations, each typically in a different subject of analysis (e.g., question and passage). This can be denoted by label(<qt1,qt2>,<pt1,pt2>)=value. In general, <qt1,qt2> may be called the "left" relation and <pt1,pt2> called the "right" relation, or the relations can be referred to as a "question" and "passage" relation respectively.

A "relation match model" is a parameterized function that is applied to a relation match feature vector and may produce a scalar between 0 and 1. The resulting scalar is called a "relation match score". A higher value for a relation match score may signify a higher degree of match between the two relations.

A "relation chain" is a match between a sequence of question terms and a sequence of passage terms, whose value is the sequence of relation-match scores between the neighboring sets of pairs. For example, given a question of "Who fired the bullet that killed JFK?" and a passage "LHO fired the bullet that struck JFK", a number of relation match features and relation match scores can be defined. Examples of relation match features and relation match scores include: relation-match score
(<LHO,fired>,<LHO,fired>)=0.99; relation-match score (<fired,bullet>,<fired,bullet>)=0.99; and relation-match score
(<bullet,JFK>,<bullet,JFK>)=0.6. Generally relations are transitive, so if there is support for LHO firing a bullet, and there is support for the bullet striking JFK, then there is support for LHO firing a bullet that struck JFK. Thus, a relation-match chain can be defined as relation-match chain (<LHO,fired,bullet,JFK>, <LHO,fired,bullet,JFK>) =[0.99, 0.99, 0.6]). A combination function applied to the relation-match chain, in turn, produces a new relation match score between the endpoints.

Figure 2:
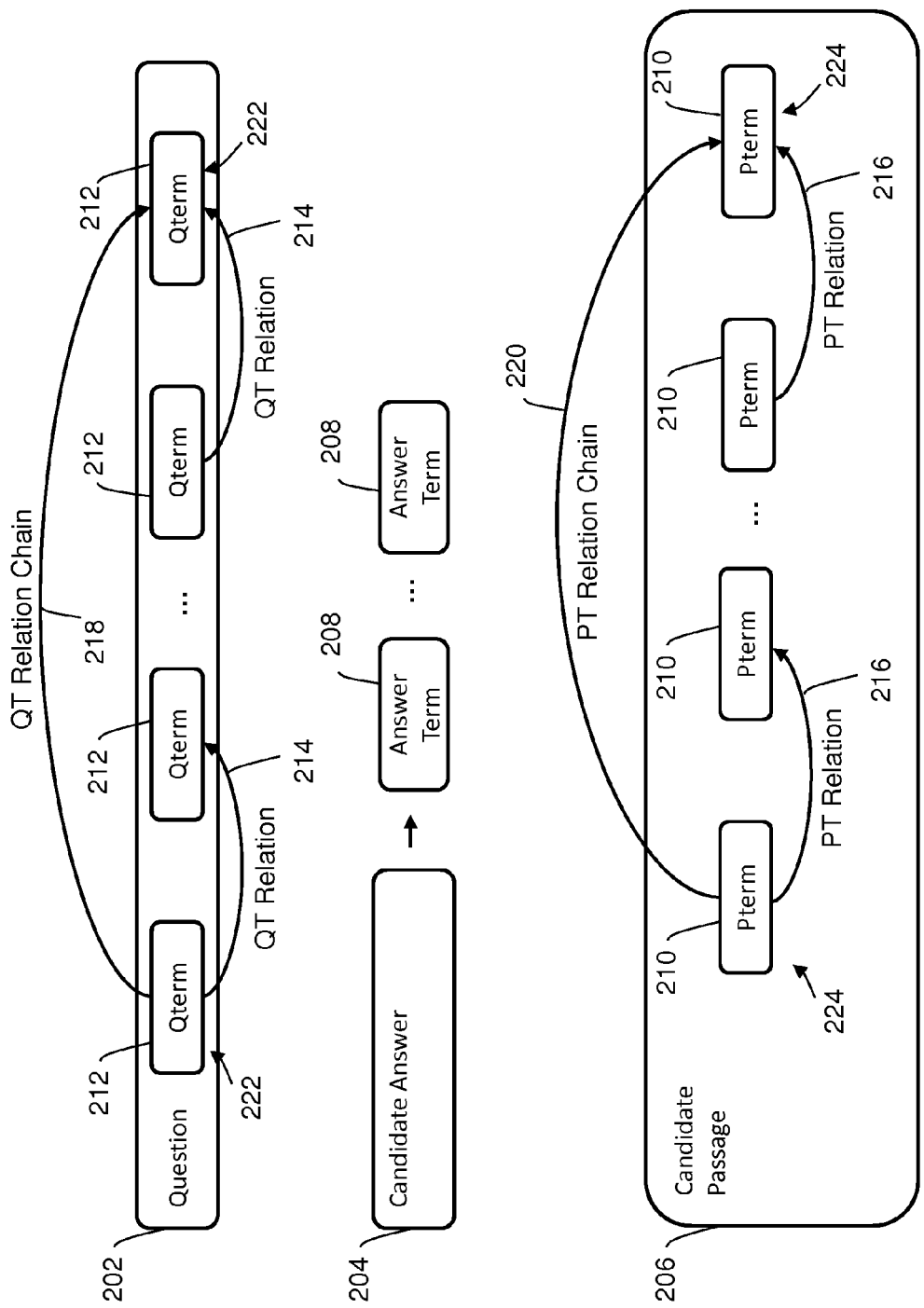
FIG. 2 depicts an example of terms and relations for matching in accordance with an embodiment.
Figure 3:
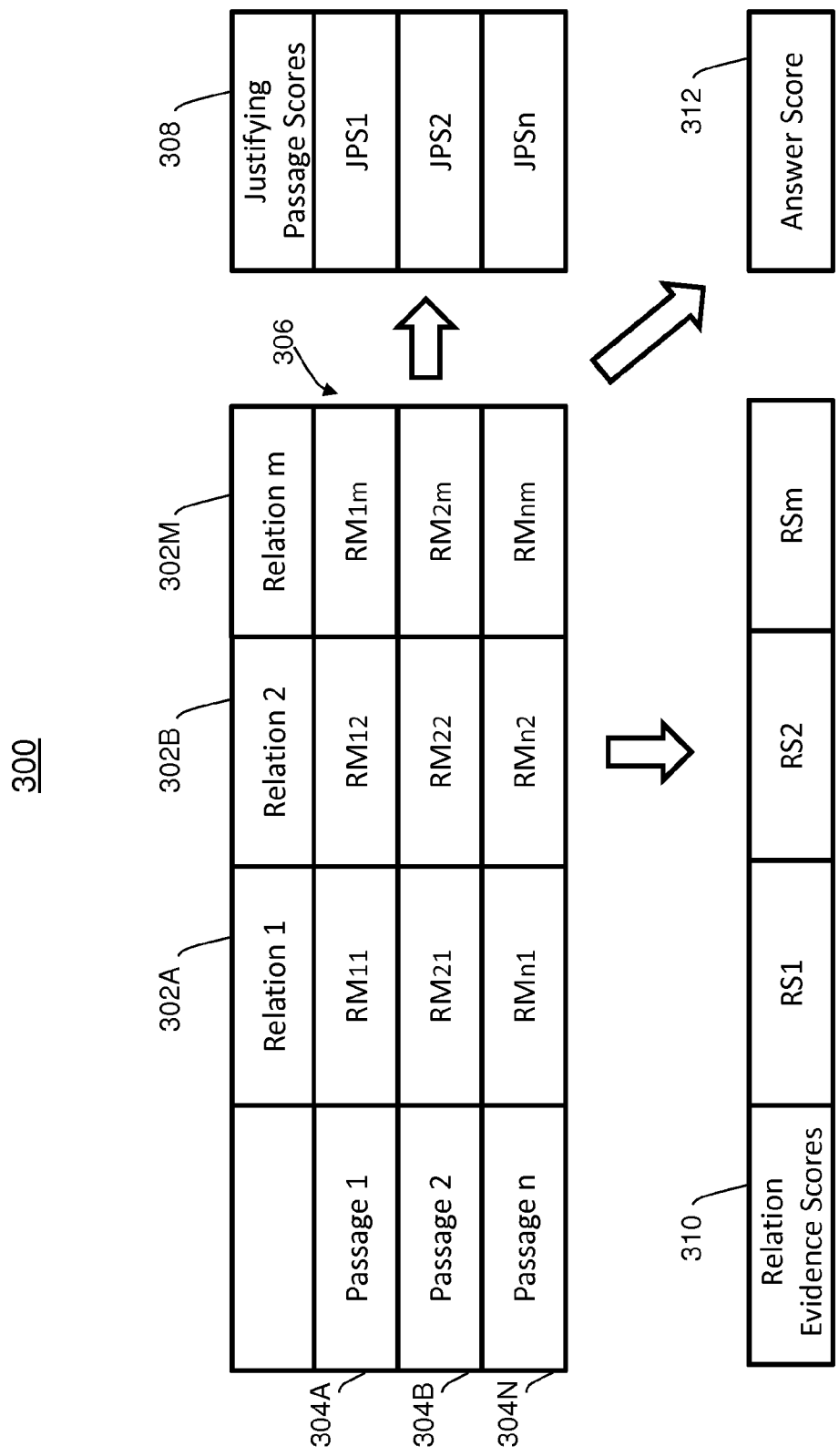
FIG. 3 depicts an example of a maximum relation match score matrix in accordance with an embodiment.

Turning to the figures, FIG. 1 depicts a block diagram of a dataflow 100 for evaluating passages by aggregation of relation matches in accordance with an embodiment. The dataflow 100 can be implemented on a question answering computer system as part of a question-answer framework. With reference to FIGS. 2-3 and continued reference to FIG. 1, a question and candidate answer dataset 102 can include a question 202 and a candidate answer 204 that may correctly answer the question 202. A passage data source 104 can include a number of candidate passages, such as candidate passage 206 that includes terms of the candidate answer 204 and additional information. The candidate answer 204 can be decomposed into one or more answer terms 208 by a term and relation extractor 106, where one or more passage terms 210 in the candidate passage 206 include at least one of the answer terms 208 as one or more candidate answer occurrence terms. The question 202 can also be decomposed into one or more question terms 212 by the term and relation extractor 106. The term and relation extractor 106 can also identify or assign a plurality of relations between pairs of terms. For example, question term relations 214 can be identified between pairs of the question terms 212, and passage term relations 216 can be identified between pairs of passage terms 210. The term and relation extractor 106 may run one or more relation scoring algorithms to generate relation match features for any pairs of relations (<qt1,qt2>, <pt1,pt2>), where <qt1,qt2> is an example of a pair of question terms 212 having a question term relation 214 between them, and <pt1,pt2> is an example of a pair of passage terms 210 having a passage term relation 216 between them.

A relation matcher 108 can apply a relation match model to compute relation match scores for all pairs of relations (<qt1,qt2>, <pt1,pt2>) identified by the term and relation extractor 106. The relation matcher 108 can analyze relation matches to find relation match chains, and compute updated relation match scores for all pairs of relations (<qt1,qt2>, <pt1,pt2>). For example, relation match scores can be computed for pairs of the question term relation 214 and the passage term relation 216. Furthermore, relation chains can be identified, such as a question term relation chain 218 between two or more of the question term relations 214 and a passage term relation chain 220 between two or more of the passage term relations 216. The question term relation chain 218 extends question term endpoints 222 to link more than two question terms 212. Similarly, the passage term relation chain 220 extends passage term endpoints 224 to link more than two passage terms 216. A relation match chain is a match on a sequence of terms, such as scoring a match between the question term relation chain 218 and the passage term relation chain 220.

The relation matcher 108 may also compute a maximum relation match score (MRMS) matrix 300, including maximum relation match scores for relations of interest across all candidate passages from the passage data source 104. Cell aggregation of the MRMS matrix 300 can be performed by the relation matcher 108 to produce one or more justifying passage score, one or more relation evidence score, and/or an answer score. For example, with respect to FIG. 3, the MRMS matrix 300 is a matrix where columns 302A-302M represent relations of interest in the question 202 and rows 304A-304N represent passages (e.g., instances of the candidate passage 206) containing terms of the candidate answer 204. The value of cells 306 for a relation R and a passage P is the maximum of all relation match scores ($RM_{11}$, $RM_{12}$, $RM_{1m}$, $RM_{21}$, $RM_{22}$, $RM_{2m}$, . . . $RM_{n1}$, $RM_{n2}$, $RM_{nm}$) for R with any relation in P. Justifying passage scores 308 can be computed as an aggregation across columns 302A-302M of the MRMS matrix 300 for each of the rows 304A-304N, which may be indicative of how good a particular candidate passage 206 is at justifying the candidate answer 204 to the question 202. Relation weights may be used for determining the justifying passage scores 308.

Aggregation down the rows 304A-304N for each of the columns 302A-302M forms relation evidence scores 310, which are intended to indicate how much support there is (across all passages) for a particular relation being true. Aggregation across the MRMS matrix 300 forms an answer score 312, which can provide an indication to a passage scorer 110 how much support there is (across all passages) for the candidate answer 204 being correct. As with the justifying passage scores 308, the answer score 312 may use relation weights. The determination of the answer score 312 may be a feature in a final ranking model of a question answering computer system.

One or more components of the dataflow 100 may implement supervised machine learning for combining relation matching algorithms, including identifying a ground truth for what constitutes a correct relation match. Textual entailment (e.g., a candidate passage that is justifying) or a correct answer may serve as a ground truth for machine learning. One embodiment may produce algebraic formulas that indicate how each of the final scores (e.g., justifying passage scores 308 and answer score 312) was computed from relation match features. Parameter optimization algorithms may then find assignments of weights to relation match features that minimize a loss function on the final scores with respect to the ground truth. The term and relation extractor 106, relation matcher 108, and passage scorer 110 of FIG. 1 may be implemented as computer readable instructions in memory for execution by a processing system as part of a question answering computer system.

Figure 4:
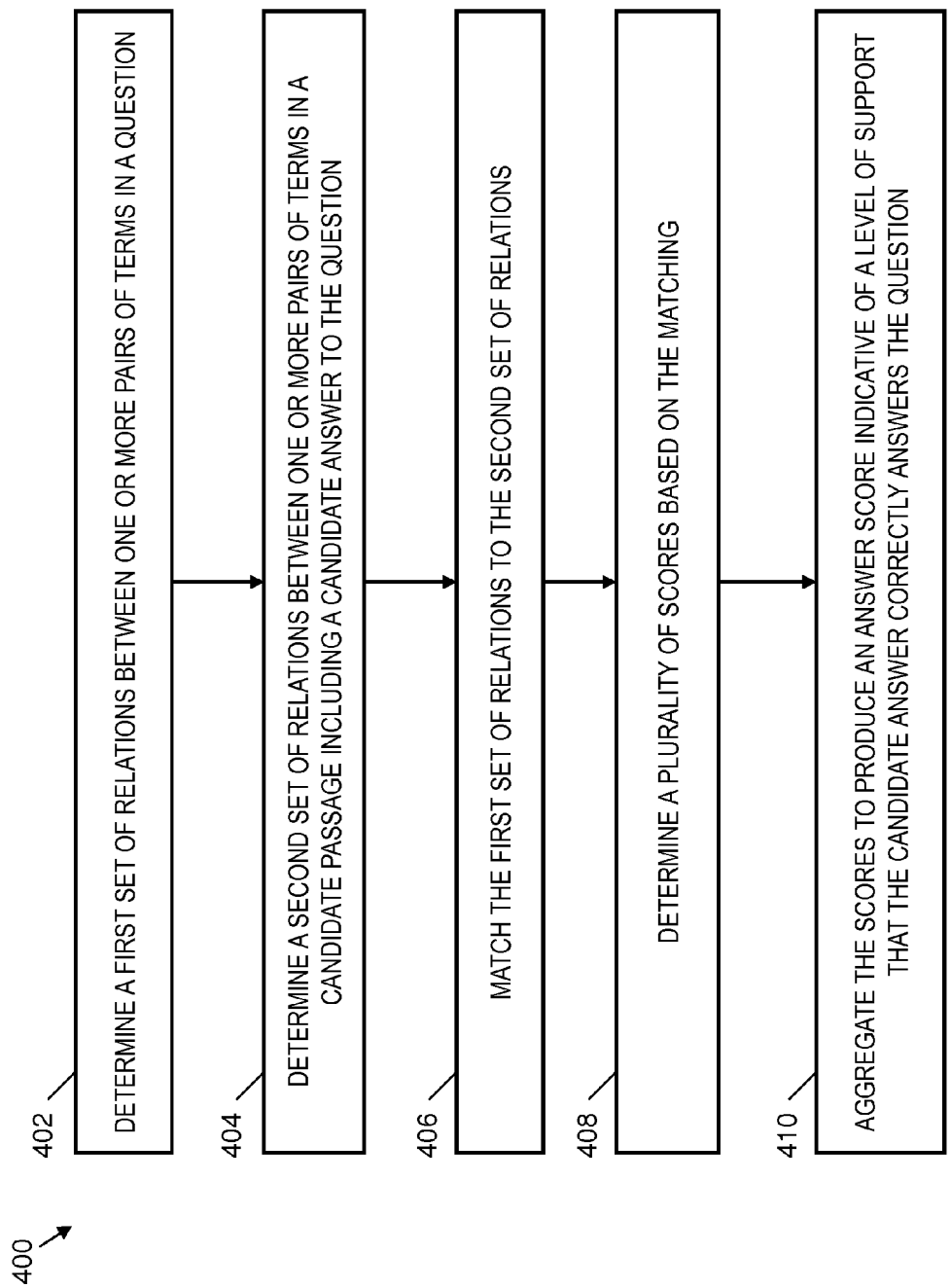
FIG. 4 depicts a process flow for evaluating passages by aggregation of relation matches in accordance with an embodiment.

FIG. 4 depicts a process flow 400 for evaluating passages by aggregation of relation matches in a question answering computer system in accordance with an embodiment. The process flow 400 provides an example of a method for evaluating passages by aggregation of relation matches in a question answering computer system. For purposes of explanation, the process flow 400 is described in terms of the examples of FIGS. 1-3 but can be implemented on various system configurations.

At block 402, a processing system of a question answering computer system can determine a first set of relations between one or more pairs of terms in a question 202, such as question term relations 214 between pairs of question terms 212 of FIG. 2. At block 404, the processing system of the question answering computer system can determine a second set of relations between one or more pairs of terms in a candidate passage 206 including a candidate answer 204 to the question 202, such as passage term relations 216 between passage terms 210 of FIG. 2. At block 406, the processing system can match the first set of relations to the second set of relations. One or more of the first set of relations and the second set of relations can include one or more relation chain, such as question term relation chain 218 and passage term relation chain 220 of FIG. 2. At block 408, the processing system can determine a plurality of scores based on the matching, such as relation match scores $RM_{11}$-$RM_{nm}$ of FIG. 3. At block 410, the processing system can aggregate the scores to produce an answer score 312 of FIG. 3 indicative of a level of support that the candidate answer 204 correctly answers the question 202.

There can be a plurality of candidate passages to analyze for scoring, as $Passage_1$-$Passage_n$ in rows 304A-304N of FIG. 3. In an embodiment, a plurality of the second set of relations between one or more pairs of terms is determined in a plurality of candidate passages. A justifying passage score (JPS1, JPS2, . . . , JPSn of FIG. 3) may be computed for each of the candidate passages based on matching the first set of relations to each of the second set of relations per candidate passage as $Relation_1$-$Relation_m$ across columns 302A-302M and rows 304A-304N of FIG. 3. Aggregating the scores to produce the answer score in block 410 of FIG. 4 can further include aggregating the justifying passage score (JPS1, JPS2, . . . , JPSn of FIG. 3) for each of the candidate passages. The justifying passage score (JPS1, JPS2, . . . , JPSn of FIG. 3) for each of the candidate passages and the answer score 312 may be defined as final scores. One or more algebraic formulas can be produced indicating how each of the final scores was computed based on relation match features of the matching. For example, JPS1=$RM_{11}$*$Relation_1$ weight+$RM_{12}$*$Relation_2$ weight+ . . . $RM_{1m}$*$Relation_m$ weight. Assignments of a plurality of relation weights to the relation match features can be found that minimize a loss function on the final scores with respect to the candidate answer 204. One or more relation weights may be applied to the matching to compute the justifying passage score (JPS1, JPS2, . . . , JPSn of FIG. 3) for each of the candidate passages. One or more relation weights may be applied for each of the candidate passages to produce the answer score 312. A plurality of relation evidence scores (RS1, RS2, . . . , RSm of FIG. 3) can be computed for each of the first set of relations relative to the second set of relations for the candidate passages, i.e., computed down all rows 304A-304N for each column 302A-302M.

Figure 5:
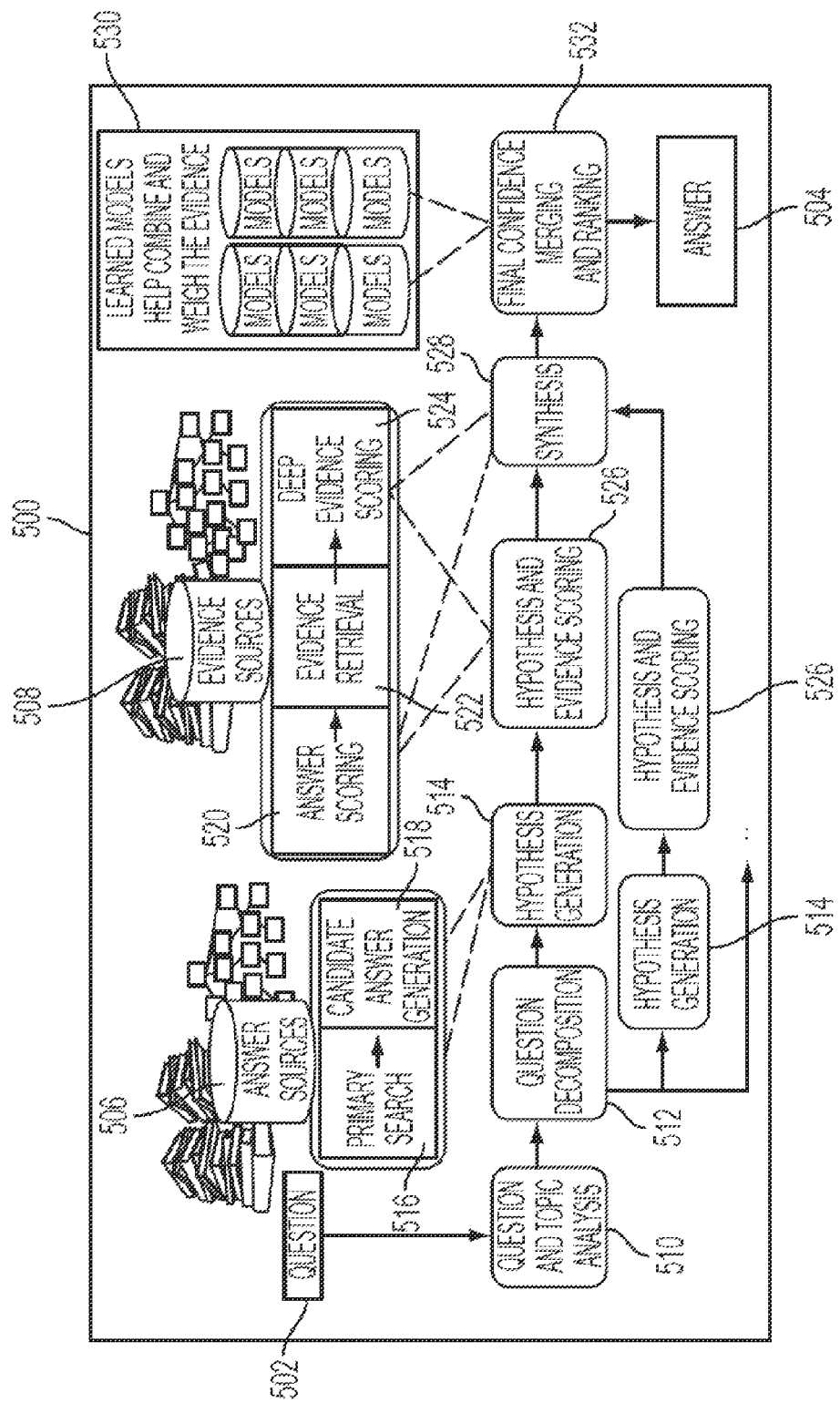
FIG. 5 depicts a high-level block diagram of a question-answer (QA) framework where embodiments of evaluating passages by aggregation of relation matches can be implemented in accordance with an embodiment.

Turning now to FIG. 5, a high-level block diagram of a question-answer (QA) framework 500 where embodiments described herein can be utilized is generally shown.

The QA framework 500 can be implemented to generate a ranked list of answers 504 (and a confidence level associated with each answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5 is implemented by the Watson™ product from IBM.

The QA framework 500 shown in FIG. 5 defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5, the question and topic analysis 510 is performed and used in question decomposition 512. Hypotheses are generated by the hypothesis generation block 514 which uses input from the question decomposition 512, as well as data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. A ranked list of answers 504 (and a confidence level associated with each answer) is then output.

Evidence retrieval and scoring plays a key role in the QA framework 500 shown in FIG. 5. Embodiments of evaluating passages by aggregation of relation matches can be utilized by the QA framework 500 to improve evidence retrieval and scoring. Embodiments can be utilized, for example, in deep evidence scoring 524, where relation matching and weights can be utilized to score candidate passages from evidence sources 508 as justifying or not justifying a candidate answer.

The framework 500 shown in FIG. 5 can utilize embodiments of evaluating passages by aggregation of relation matches described herein to create learned models 530 by training statistical machine learning algorithms on prior sets of questions and answers to learn how best to weight each of the hundreds of features relative to one another. These weights can be used at run time to balance all of the features when combining the final scores for candidate answers to new questions 502. In addition, embodiments can be used to generate a knowledgebase (KB) based on a corpus of data that replaces or supplements commercially available KBs. The final confidence merging and ranking 532 may calculate or utilize the answer score 312 of FIG. 3.

Figure 6:
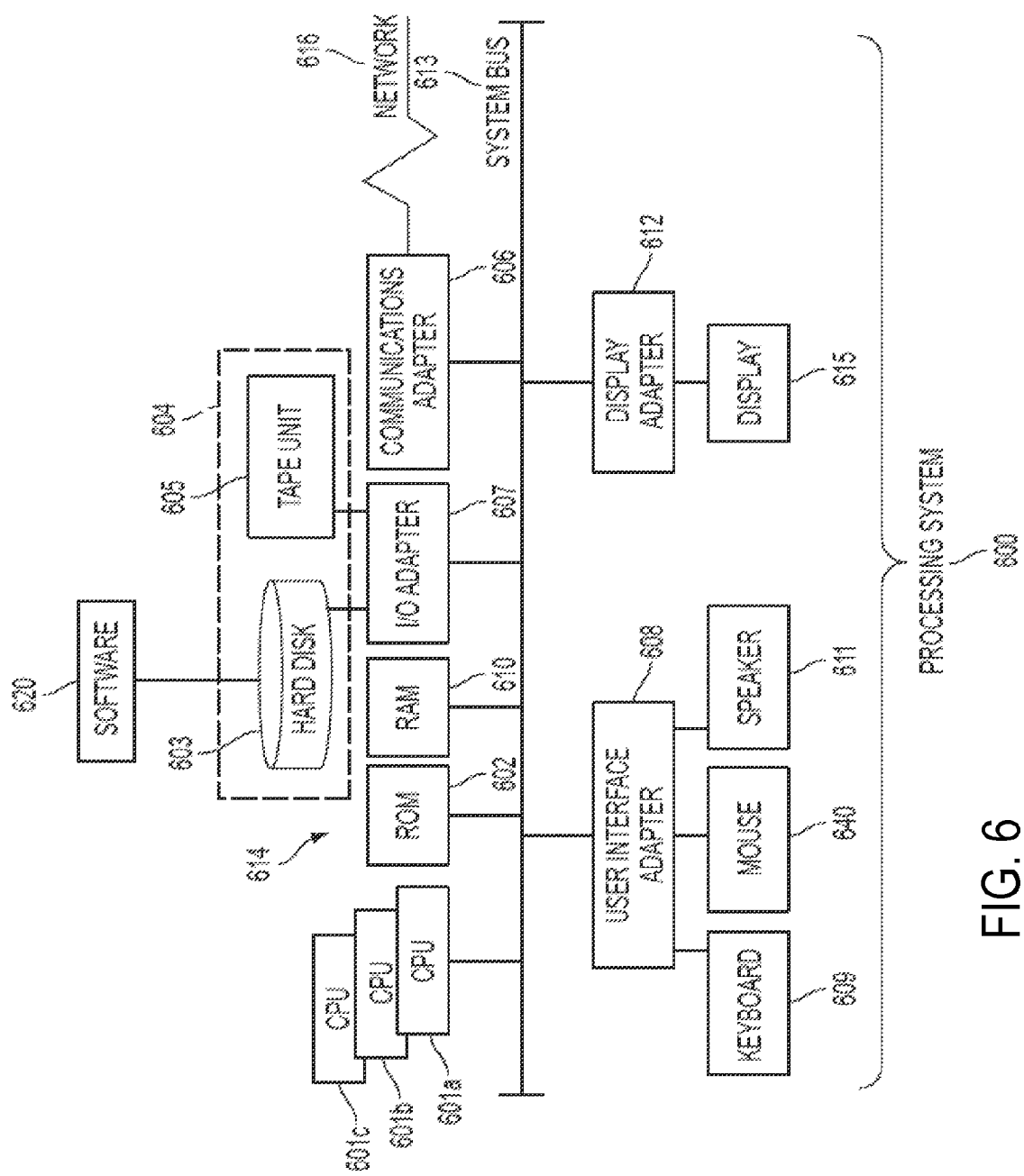
FIG. 6 depicts a processing system in accordance with an embodiment.

Referring now to FIG. 6, there is shown an embodiment of a processing system 600 for implementing the teachings herein. The processing system 600 is an example of part or all of a question answering computer system as previously referenced herein, where a question answering computer system may include a combination of one or more of the processing system 600 to enhance processing throughput using parallelism and/or cloud computing. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as computer readable instructions for execution by the processors 601 to perform a method, such as the process flow 400 of FIG. 4. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects and benefits include evaluating passages by aggregation of relation matches in a question answering computer system. Relation matching of relations and relation chains can improve performance of a question answering computer system, such as one or more instance of the processing system 600 of FIG. 6, by improving accuracy of passage scoring and thus improving overall question answering accuracy.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining, by a processing system of a question answering computer system, a first set of relations between one or more pairs of terms in a question;
   determining, by the processing system, a second set of relations between one or more pairs of terms in a candidate passage comprising a candidate answer to the question;
   matching, by the processing system, the first set of relations;
   determining, by the processing system, a plurality of scores based on the matching by applying a relation match model;
   identifying, by the processing system, at least one question term relation chain between two or more question term relations in the first set of relations that link two or more pairs of terms in the question;
   extending a question term endpoint based on linking two or more pairs of terms in the question to form the at least one question term relation chain;
   identifying, by the processing system, at least one passage term relation chain between two or more passage term relations in the second set of relations that link two or more pairs of terms in the candidate answer;
   extending a passage term endpoint based on linking two or more pairs of terms in the passage to form the at least one passage term relation chain;
   updating, by the processing system, the scores based on matching a sequence of terms between the at least one question term relation chain and the at least one passage term relation chain as a relation match chain comprising relation match scores between endpoints of the at least one question term relation chain and the at least one passage term relation chain; and
   aggregating, by the processing system, the scores to produce an answer score indicative of a level of support that the candidate answer correctly answers the question.

2. The method of claim 1, further comprising:
   determining a plurality of the second set of relations between one or more pairs of terms in a plurality of candidate passages; and
   computing a justifying passage score for each of the candidate passages based on matching the first set of relations to each of the second set of relations per candidate passage, wherein aggregating the scores to produce the answer score further comprises aggregating the justifying passage score for each of the candidate passages.

3. The method of claim 2, wherein the justifying passage score for each of the candidate passages and the answer score are final scores, and further comprising:
   producing one or more algebraic formulas indicating how each of the final scores was computed based on relation match features of the matching.

4. The method of claim 3, further comprising:
   finding assignments of a plurality of relation weights to the relation match features that minimize a loss function on the final scores with respect to the candidate answer.

5. The method of claim 2, further comprising:
   applying one or more relation weights to the matching to compute the justifying passage score for each of the candidate passages.

6. The method of claim 2, further comprising:
   applying one or more relation weights for each of the candidate passages to produce the answer score.

7. The method of claim 2, further comprising:
   computing a plurality of relation evidence scores for each of the first set of relations relative to the second set of relations for the candidate passages.

* * * * *